G. L. CROSBY.
INHALER.

No. 178,362. Patented June 6, 1876.

WITNESSES:
Francis W. Andle.
John Goethals

INVENTOR:
G. L. Crosby
BY
ATTORNEYS.

UNITED STATES PATENT OFFICE.

GEORGE L. CROSBY, OF HANNIBAL, MISSOURI.

IMPROVEMENT IN INHALERS.

Specification forming part of Letters Patent No. 178,362, dated June 6, 1876; application filed March 25, 1876.

*To all whom it may concern:*

Be it known that I, GEORGE L. CROSBY, of Hannibal, in the county of Marion and State of Missouri, have invented a new and Improved Inhaler, of which the following is a specification:

The invention consists in combining a glass stopper, having acid-receptacle and air-passages, with a grooved stopper and tubes, as more particularly hereinafter described.

Figure 1:
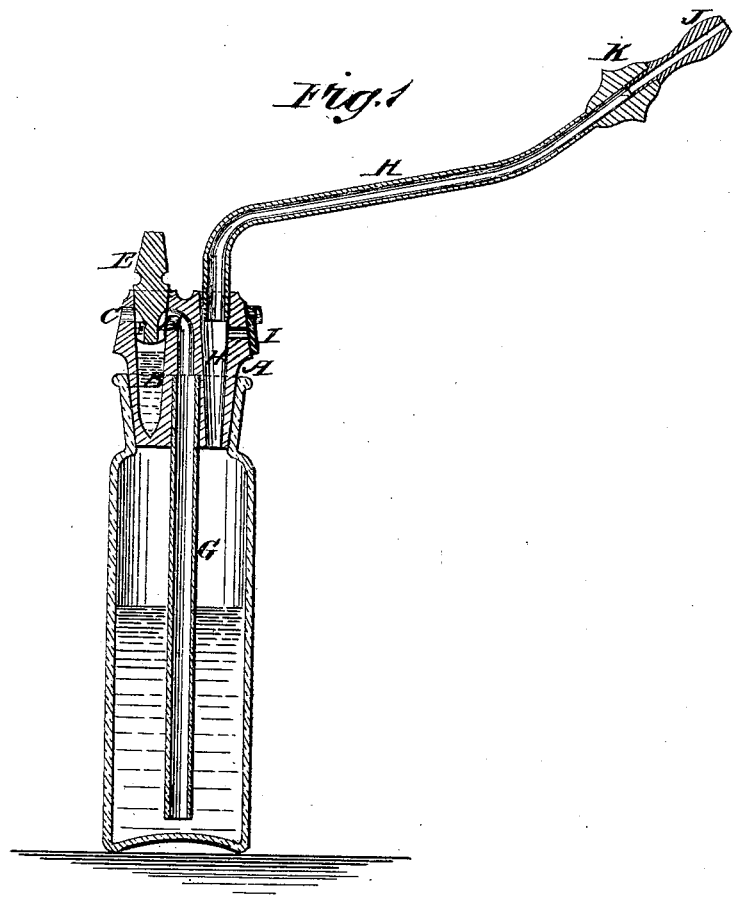
Figure 2:
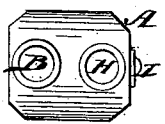

Figure 1 is a sectional elevation of an inhaler contrived according to my improvement, and Fig. 2 is a top view.

Similar letters of reference indicate corresponding parts.

A is the bottle-stopper, of glass or other approved material, in which is an acid-receptacle, B, through the upper portion of which is an air-passage, C D, and the top is closed by a stopper, E, the sides of which are grooved at F, to cause the air to pass down to the surface of the acid to take up the fumes. From the acid-receptacle the fumes are drawn down through the tube G into the liquid in the body of the inhaler, to be inhaled through the flexible tube H.

I is the relief-valve for the escape of air blown into the inhaler, to prevent the liquid from being blown up into the acid-receptacle, which I propose to locate on the side of the stopper A, in the manner shown, instead of applying it to the tube, which is a better, cheaper, and more durable arrangement.

J is a mouth-piece, which I propose to apply detachably to the nasal bulb K, so that the inhaler can be readily applied to the mouth, if desired.

Having thus described my invention, I claim as new and desire to secure by Letters Patent—

The combination, with tubes G H, of glass stopper A, having acid-receptacle B, air-passages C D, and valve I, and the stopper E, grooved at F, substantially as and for the purpose specified.

GEORGE L. CROSBY.

Witnesses:
CHS. J. VAUBOURGH,
JOSHUA M. GIBBS.